(12) United States Patent
Zaetterqvist

(10) Patent No.: US 10,696,401 B2
(45) Date of Patent: Jun. 30, 2020

(54) COUNTERMEASURE DISPENSER WITH VARIABLE SPOILER AND METHOD FOR LAUNCHING A COUNTERMEASURE

(71) Applicant: SAAB AB, Linkoeping (SE)

(72) Inventor: Christer Zaetterqvist, Uppsala (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/301,604

(22) PCT Filed: May 5, 2017

(86) PCT No.: PCT/SE2017/050438
§ 371 (c)(1),
(2) Date: Nov. 14, 2018

(87) PCT Pub. No.: WO2017/200456
PCT Pub. Date: Nov. 23, 2017

(65) Prior Publication Data
US 2019/0283879 A1    Sep. 19, 2019

(30) Foreign Application Priority Data

May 17, 2016    (SE) ...................................... 1650667

(51) Int. Cl.
*B64D 7/00*         (2006.01)
*B64C 9/34*         (2006.01)
(Continued)

(52) U.S. Cl.
CPC .................. *B64D 7/00* (2013.01); *B64C 9/34* (2013.01); *B64D 1/02* (2013.01); *F41F 1/08* (2013.01); *F41H 11/02* (2013.01); *F42B 5/15* (2013.01)

(58) Field of Classification Search
CPC ................ B64D 7/00; B64D 1/02; B64C 9/34
(Continued)

(56) References Cited

U.S. PATENT DOCUMENTS 2,391,956 A    1/1946    Eastman
2,467,514 A    4/1949    Woodman
(Continued)

FOREIGN PATENT DOCUMENTS

DE    3902624 A1    8/1990
EP    0253028 B1    8/1990
(Continued)

OTHER PUBLICATIONS

International Searching Authority, International Search Report and Written Opinion for International Application No. PCT/SE2017/050438, dated Jul. 27, 2017, 12 pages, Swedish Patent and Registration Office, Sweden.
(Continued)

*Primary Examiner* — Joshua E Freeman
*Assistant Examiner* — Bridget A Cochran
(74) *Attorney, Agent, or Firm* — Alston & Bird LLP

(57) ABSTRACT

A dispenser for storing and launching countermeasures from an aircraft, comprising an elongate body provided with at least one launch opening adapted for storing the countermeasures in cartridges, where the dispenser comprises a manoeuvrable spoiler arranged in front of the launch opening, where the spoiler is adapted to be fully retracted before a countermeasure has been launched, and that the spoiler is adapted to extend outwards in a predefined manner when a countermeasure has been launched. The advantage of the invention is that a spoiler will reduce induced noise from the open cartridges by extending a spoiler outwards depending on the number of launched countermeasures. This allows for a simple, reliable and cost-effective solution.

20 Claims, 2 Drawing Sheets

(51) Int. Cl.
   *B64D 1/02* (2006.01)
   *F41F 1/08* (2006.01)
   *F41H 11/02* (2006.01)
   *F42B 5/15* (2006.01)

(58) Field of Classification Search
   USPC .......................................................... 89/1.51
   See application file for complete search history.

(56) References Cited

U.S. PATENT DOCUMENTS

| | | | |
|---|---|---|---|
| 3,808,595 | A | 4/1974 | Coop et al. |
| 3,934,846 | A * | 1/1976 | Maurer ............... B64D 1/04 244/130 |
| 4,280,394 | A | 7/1981 | Singenberger et al. |
| 4,674,393 | A | 6/1987 | Schaulin et al. |
| 5,198,609 | A | 3/1993 | Gillman |
| 5,340,054 | A | 8/1994 | Smith et al. |
| 5,699,981 | A * | 12/1997 | McGrath ............... B64C 23/005 181/206 |
| 6,098,925 | A * | 8/2000 | Burdsall, II ............. B64D 1/06 244/118.1 |
| 6,231,002 | B1 | 5/2001 | Hibma et al. |
| 7,640,858 | B1 | 1/2010 | Herbage et al. |
| 10,495,424 | B2 | 12/2019 | Zaetterqvist |
| 2001/0015126 | A1 | 8/2001 | Grunewald |
| 2003/0117309 | A1 | 6/2003 | Pappert et al. |
| 2004/0104309 | A1 * | 6/2004 | Segota ............... B63B 1/248 244/204 |
| 2005/0204910 | A1 | 9/2005 | Padan |
| 2010/0294119 | A1 | 11/2010 | Buechler et al. |
| 2010/0326262 | A1 * | 12/2010 | Galanti ............... B64D 7/00 89/1.51 |
| 2011/0155856 | A1 * | 6/2011 | Zachrisson ............... B64D 7/00 244/136 |
| 2012/0104174 | A1 * | 5/2012 | Zatterqvist ............... F41J 2/02 244/137.1 |
| 2012/0125183 | A1 * | 5/2012 | Zatterqvist ............... B64D 7/00 89/1.51 |
| 2012/0210855 | A1 | 8/2012 | Clark et al. |
| 2016/0121996 | A1 * | 5/2016 | Eveker ............... B64C 23/005 244/130 |
| 2019/0092469 | A1 | 3/2019 | Zaetterqvist |
| 2019/0137220 | A1 | 5/2019 | Zaetterqvist |
| 2019/0178613 | A1 | 6/2019 | Zaetterqvist |

FOREIGN PATENT DOCUMENTS

| | | |
|---|---|---|
| EP | 1247735 A3 | 1/2004 |
| EP | 1194331 B1 | 5/2004 |
| EP | 2157398 A2 | 2/2010 |
| EP | 2279119 B1 | 12/2015 |
| EP | 2421754 B1 | 10/2016 |
| GB | 2410542 A | 8/2005 |
| GB | 2505721 A1 | 3/2014 |
| WO | WO 2010/123423 A1 | 10/2010 |
| WO | WO-2014/140587 A1 | 9/2014 |
| WO | WO 2015/072901 A1 | 5/2015 |

OTHER PUBLICATIONS

Extended European Search Report for European Patent Application No. 17799760.8, dated Nov. 18, 2019, (8 pages), European Patent Office, Munich, Germany.

International Searching Authority, International Search Report and Written Opinion for International Application No. PCT/SE2017/050436, dated Jul. 21, 2017, 12 pages, Swedish Patent and Registration Office, Sweden.

International Searching Authority, International Search Report and Written Opinion for International Application No. PCT/SE2017/050440, dated Jul. 21, 2017, 12 pages, Swedish Patent and Registration Office.

International Searching Authority, International Search Report and Written Opinion for International Application No. PCT/SE2017/050437, dated Jul. 21, 2017, 12 pages, Swedish Patent and Registration Office.

International Searching Authority, International Search Report and Written Opinion for International Application No. PCT/SE2017/050441, dated Jul. 21, 2017, 13 pages, Swedish Patent and Registration Office.

International Searching Authority, International Search Report and Written Opinion for International Application No. PCT/SE2017/050442, dated Aug. 4, 2017, 14 pages, Swedish Patent and Registration Office.

Extended European Search Report for European Patent Application No. 17799758.2, dated Nov. 21, 2019, (6 pages), European Patent Office, Munich, Germany.

Extended European Search Report for European Patent Application No. 17799759.0, dated Nov. 21, 2019, (7 pages), European Patent Office, Munich, Germany.

Extended European Search Report for European Patent Application No. 17799763.2, dated Nov. 21, 2019, (7 pages), European Patent Office, Munich, Germany.

Extended European Search Report for European Patent Application No. 17799764.0, dated Nov. 26, 2019, (8 pages), European Patent Office, Munich, Germany.

* cited by examiner

COUNTERMEASURE DISPENSER WITH VARIABLE SPOILER AND METHOD FOR LAUNCHING A COUNTERMEASURE

CROSS REFERENCE TO RELATED APPLICATIONS

This application is a National Stage Application, filed under 35 U.S.C. § 371, of International Application No. PCT/SE2017/050438, filed May 5, 2017, which claims priority to Swedish Application No. 1650667-7, filed May 17, 2016; the contents of all of which are hereby incorporated by reference in their entireties.

BACKGROUND

Related Field

Technical Field

The present invention relates to a dispenser arrangement for countermeasure devices, where the dispenser is provided with a variable spoiler.

Description of Related Art

Arrangements for storing and launching payloads, such as countermeasures, which are designed to be mounted on aircrafts, are previously known. Such arrangements comprise an elongate body provided with at least one launch opening. The shape of the arrangement may have other equivalent shapes, such as an elliptic or circular shape. However, an elongate body is an efficient shape. Such arrangements are mounted with the longitudinal direction of the elongate body essentially coinciding with the flight direction of the aircraft. The countermeasures are connected to a firing control unit for feeding firing signals to the countermeasures. The countermeasures can consist of passive means, such as chaff foil, but can also consist of for example IR flares, or other active measures. The countermeasures are stored in a magazine in the arrangement, comprising a plurality of cartridges, with one countermeasure in each cartridge.

One problem with known arrangements is that unfavourable acoustic phenomenon, such as extremely high air induced noise and vibration levels, are generated due to the open cavities of the cartridges holding the countermeasures, after firing of the countermeasures. The relative wind speed, due to the speed of the aircraft, interacts with the opening of an empty cartridge in which a countermeasure has been stored. The open cavity may act as barrels which oscillate at its natural inherent frequency. This acoustic noise can be localised by human ear and may also cause damage on the equipment, such as electric components, due to the strong vibrations created. The longitudinal extension and the number of openings of the cartridges in the elongated body can be rather large. The angle of a cartridge relative the travelling direction of the aircraft will also affect the induction of acoustic noise.

It is known to arrange a vortex generating means in front of a launch opening, which is adapted to disturb and distribute the wind flow over the magazine in order to reduce the induced noise. However, the effect of such a vortex generating means decreases with the increasing length of the launch opening, since the air flow will be more laminar farther away from the vortex generating means, i.e. the air flow may be relatively laminar at the rear of a longer opening.

Further, such a vortex generating means will generate turbulent flows that are difficult to control and that will result in high energy losses. Such a solution may also contribute to an increased extension of the design of the arrangement in the longitudinal extension of the elongated body.

A further problem with such an arrangement is that the arrangement is sensitive for influence of the air flow depending e.g. on the speed of the aircraft and of the position of the elongated body.

An example of a previously known arrangement described as a dispenser which is used for launching countermeasures and which is provided with several compartments, is described in document EP 1194331 B1. An elongated body of the dispenser is provided with fixed means, described as a spoiler, in front of each compartment for acting on the air stream and for creating a low dynamic pressure across the compartment openings.

From document EP 0253028 B1, it is known to provide the exterior surface of an aircraft with a pair of vortex generators arranged right in front of an inlet opening in order to increase the mass airflow into the inlet.

From EP 2279119 B1, it is known to arrange a fixed means in front of the launch opening in order to facilitate the launching of a countermeasure, by creating a low dynamic pressure permanently across the launch opening of the dispenser.

These solutions will reduce the acoustic noise induced by an open cavity. They will however cause a high energy loss.

From US 2016/0121996 A1, a method for managing an airflow of an aircraft is known. The aircraft is provided with a weapons bay which is opened by doors. A spoiler consisting of a frame and louvers is moved into the airflow in order to create a controlled laminar air flow passing the bay of the aircraft when the bay is open. The weapon bay is relatively large and the opening is further relatively long. In such a case, there is no risk in inducing acoustic noise since the opening, i.e. cavity, is too large. It is still of advantage to reduce the air flow over the opening. By the presented solution, the redirecting of a laminar air flow is achieved in an energy effective way, since a laminar air flow causes less drag on the aircraft and will thus require less energy.

This solution will provide a desired laminar airflow.

Even though these arrangements may give an acceptable result in some cases, there is room for improvements.

BRIEF SUMMARY

One object of the present invention is to at least partially eliminate the drawbacks associated with the solutions known in the prior art. Another object is to minimise the occurrence of acoustic phenomenon which are caused by the openings in cavities which have been emptied of payloads, such as countermeasures. Another object of the invention is to provide an aircraft comprising such a dispenser.

The solution to the problem according to the invention is described in the characterizing part of claim 1. Claim 10 contains an advantageous method for launching a countermeasure. The other claims contain advantageous embodiments and further developments of the dispenser and the method.

In a dispenser for storing and launching countermeasures, comprising an elongate body provided with at least one launch opening adapted for storing the countermeasures in cartridges, where the dispenser comprises a plurality of cartridges, where the dispenser is adapted to be mounted on an aircraft with the longitudinal direction of the elongate body essentially coinciding with the direction of motion of the aircraft, the object of the invention is achieved in that the dispenser comprises a manoeuvrable spoiler arranged in front of the launch opening, where the spoiler is adapted to be fully retracted before a countermeasure has been launched, and that the spoiler is adapted to extend outwards in a predefined manner when a countermeasure has been launched from a cartridge, where the spoiler is adapted to create a turbulent air flow over the cartridge when the countermeasure has been launched.

By this first embodiment of the dispenser according to the invention, an extendible spoiler positioned in front of the launch opening of a countermeasure dispenser is provided. The spoiler is adapted to be extended outwards from the dispenser body in dependency of the number of launched countermeasures. The spoiler will be fully retracted, i.e. will be flush with the outer surface of the dispenser, when all cartridges are loaded with a countermeasure. When a first countermeasure is launched, the spoiler will be extended outwards a small amount, such that a turbulent air flow is created over the opening of the first cartridge, and such that the air flow over the first opening is disturbed or diffused. When more countermeasures are launched, the spoiler is extended outwards some more. When all, or almost all, countermeasures are launched, the spoiler will be fully extended, such that a turbulent air flow is created over all cartridges.

The spoiler is operated by an actuator, and is controlled by an electronic control unit, which uses a measured signal as an input signal. The measured signal may in one example be a signal indicating the number of launched countermeasures. The cartridges of the countermeasures are arranged in a magazine, comprising several rows of cartridges. The countermeasures are launched sequentially, such that all countermeasures in one row will be launched before the countermeasures in the next row are launched. The signal may in this case also indicate the number of launched rows. The signal may e.g. detect the number of launch signals sent from the ECU, or may be a specific signal issued by the ECU which may control the actuator directly.

The measured signal may also be a measured acoustic signal, which detects induced noise in the cavities. Such a signal may be advantageous since it allows an actual feedback of the induced noise signal. The induced noise may depend on several conditions, such as flight speed, altitude, temperature, flight attitude, number of open cavities, etc. By using a feedback system based on a measured acoustic signal, the extension of the spoiler can be optimized at all times, which will reduce wind drag of the spoiler.

The spoiler may be either a solid spoiler, adapted to create a turbulent air flow over the openings of the cavities, or may be a diffusor spoiler, adapted to disturb the air flow such that no acoustic noise is induced. The spoiler may comprise a curvature that substantially follows a curvature of the outer surface of the dispenser, depending on the size and shape of a launch opening. Normally, the outer surface of a dispenser for countermeasures is circular, which calls for a curved spoiler.

The dispenser may comprise more than one launch opening. There may e.g. be one or more launch openings directed downwards, and one or more launch openings directed sideways. Each launch opening is preferably provided with a separate manoeuvrable spoiler.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left, etc. refer to directions of an aircraft flying forwards in a normal orientation.

Figure 1:
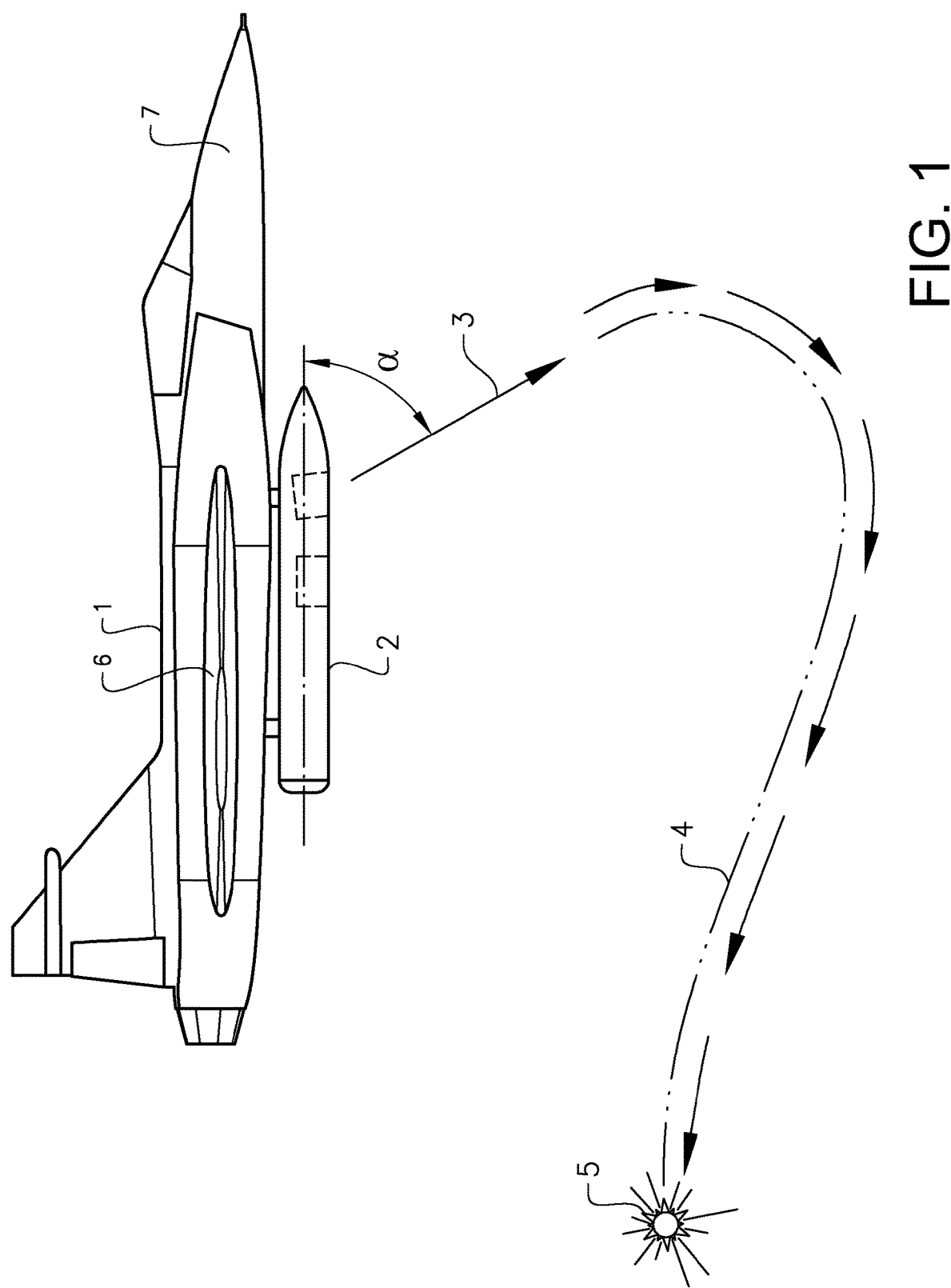
FIG. 1 shows a side view of an aircraft provided with a dispenser according to an embodiment of the invention for storing and launching countermeasures.

An aircraft 1 shown in FIG. 1 is provided with a dispenser 2 for storing and launching payloads, hereinafter described as countermeasures 5. The dispenser 2 has its longitudinal direction essentially coinciding with the longitudinal direction of the aircraft 1. An arrow 3 designates the direction of launching from the dispenser 2. The character a designates the launch angle relative to the direction of movement of the aircraft 1 when the countermeasures 5 are launched obliquely forwards and downwards The trajectory 4 for a launched flare 5 is indicated by a broken line. During the time from when a flare 5 is activated for launch to when it reaches the position shown in FIG. 1, sufficient time has elapsed for the flare 5 to have become a fully active decoy target in close proximity to the aircraft 1. In the example shown in FIG. 1, the dispenser 2 is placed under a wing 6 near its attachment to the main body 7 of the aircraft 1. It is also possible to place the dispenser 2 further out on the wing 6 or directly on the main body 7 of the aircraft 1, e.g. on the exterior of the aircraft.

Figure 2:
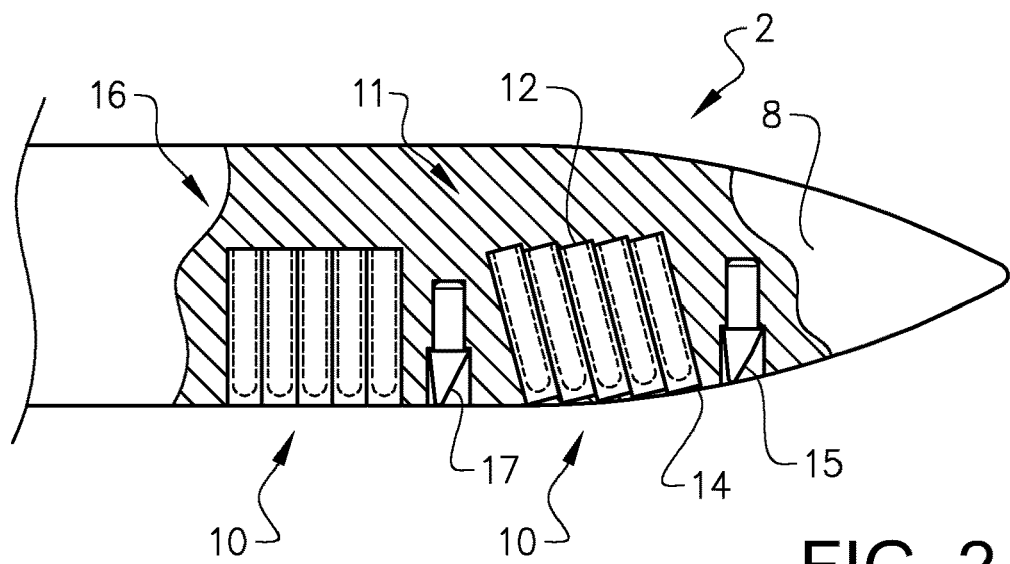
FIG. 2 shows a cut side view of a dispenser according to the invention with a spoiler in a retracted state.

The dispenser 2 is described in more detail with reference to FIGS. 2, 3 and 4. The dispenser 2 is designed as an elongate body 8, partially shown in FIG. 2, provided with at least one launch opening 10 used for storing the countermeasures 5 in a magazine comprising a plurality of cartridges 12. A cartridge 12 comprises a cavity 13 adapted to store the countermeasure 5 and is provided with a forward facing opening 14. The countermeasures 5 are connected to a launching control unit (not shown) for sending launching signals to the countermeasures. The cartridges 12 may be individual cartridges mounted to each other in a replaceable manner to form a magazine such that a cartridge can be replaced when it has been launched. A magazine may also comprise fixed cartridges, where a cavity may be reloaded with a new countermeasure. The cartridges 12 can be of the same size or of different sizes and can accommodate identical or different types of countermeasures 5.

In the example shown in FIG. 2, the dispenser comprises a first magazine 11 and a second magazine 16. The first magazine 11 is inclined forwards such that a forward launch angle is obtained. The inclination angle is chosen depending on the intended use of a countermeasure and may be e.g. between 30° to 60° relative to the aircraft 1. The magazine may also be arranged without an inclination, such that the openings of the cavities are arranged essentially perpendicular relative to the longitudinal direction of the elongate body. The second magazine 16 is arranged without an inclination. In principle, all geometrically possible positions can be considered. An inclined launch angle may be advantageous when a countermeasure is fired downwards from the dispenser, a straight launch angle may be advantageous when launching a countermeasure in a sideway direction from the aircraft.

The launch opening 10 of the first magazine 11 is further provided with a spoiler 15, and the launch opening 10 of the second magazine 16 is provided with a spoiler 17. A spoiler is arranged in front of a launch opening and is adapted to extend outwards from a fully retracted state, as shown in FIG. 2. In the retracted state, the outer surface of the spoiler is substantially aligned with the outer surface of the dispenser, such that the drag of the spoiler is minimized. The spoiler will be in this state when no countermeasure has been launched, i.e. when the magazine is full. When a countermeasure is launched, the cavity of that countermeasure will be empty, which may induce acoustic noise. The launching order of the countermeasures is preferably from the front of the magazine to the rear, starting with a countermeasure in the first row and continuing with the first row until all countermeasures of the first row are launched, and then continuing with the next row. If a magazine is loaded with different types of countermeasures in different rows, another launching order is of course necessary. In this example, a magazine is loaded with one type of countermeasures.

The advantage of using an extendable spoiler is that energy can be saved by reducing the wind drag on the aircraft. In order to reduce induced noise in an open cavity, a turbulent air flow is required. The turbulent air flow is created by a spoiler of some kind extending in the wind flow close to the dispenser. However, a turbulent wind flow creates a higher wind drag on the aircraft, such that the turbulent wind flow should be reduced as much as possible. By extending the spoiler in dependency of the open cavities, unnecessary wind drag can be minimized and at the same time, induced noise can be reduced. It is important that a turbulent air flow is created, since all types of laminar air flow may induce noise in an open cavity of a relatively small size. This can be compared with organ pipes, where a standing wave in a pipe will create a predefined tone. The open cavity may act as a barrel which oscillates at its natural inherent frequency.

When a countermeasure is launched, the spoiler is extended outwards. The amount of extension depends on the position of the empty cavity. In one example, only a cavity in the first row is empty. Since the distance between the spoiler and the open cavity is relatively small, the spoiler must only be extended outwards by a small amount, e.g. by 5-10% of the full extendable length. Normally, the extension of the spoiler will be proportional to the distance to the rearmost open cavity, but the relationship will not be linear. In one example, in a dispenser having five rows, the first row may require 10% extension of the spoiler, the second row may require 20% extension of the spoiler, the third row may require 40% extension of the spoiler, the fourth row may require 70% extension of the spoiler, and the fifth row may require 100% extension of the spoiler.

Figure 3:
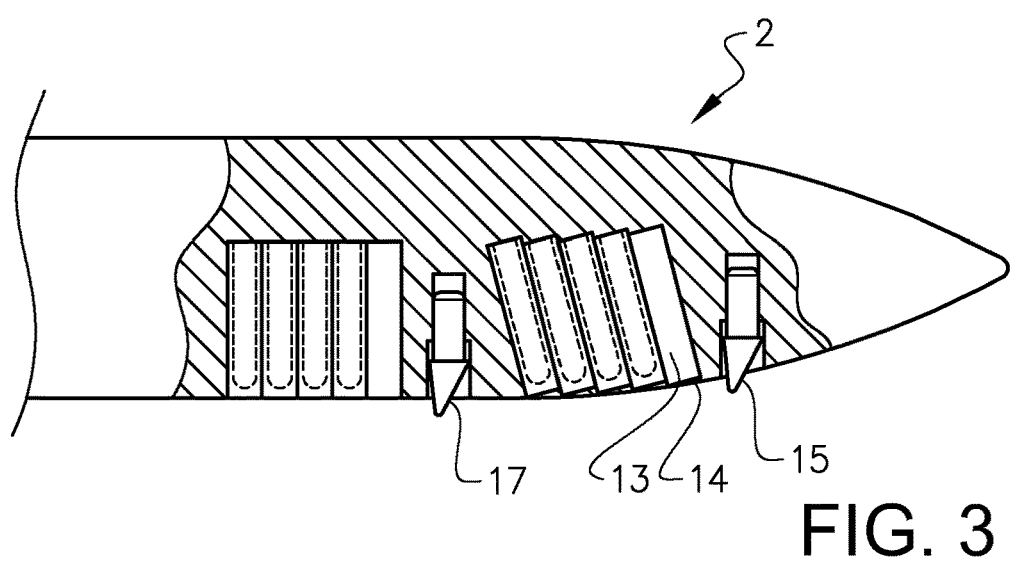
FIG. 3 shows a cut side view of a dispenser according to the invention with a spoiler in an extended state.

FIG. 3 shows a dispenser where a countermeasure in the first row of the first magazine 11 has been launched. The spoiler extends here by 15% of the total extension length of the spoiler. A turbulent air flow will now be created over and above the open cavity, which minimizes the induced acoustic noise. A countermeasure in the first row of the second magazine 16 has also been launched. The second spoiler 17 extends here with 15% of the total extension length of the spoiler, but the extension of the second spoiler may differ from the extension of the first spoiler.

Figure 4:
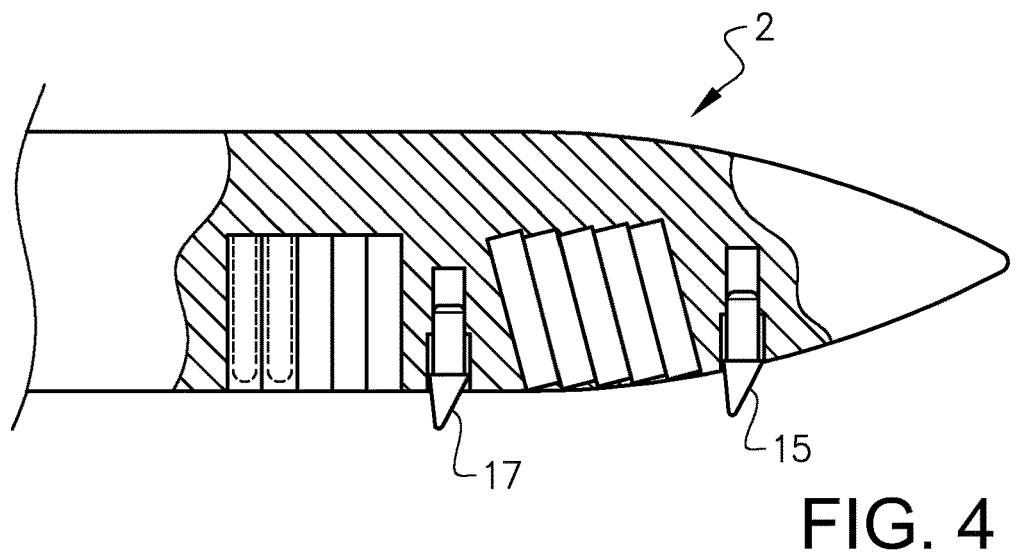
FIG. 4 shows a cut side view of a dispenser according to the invention with a spoiler in a fully extended state.

FIG. 4 shows a dispenser where all countermeasures of the first magazine 11 have been launched. The first spoiler is here fully extended, i.e. extends by 100% of the total extension length of the spoiler. A turbulent air flow is now created over and above the complete launch opening and thus over all open cavities, which minimizes the induced acoustic noise. In the second magazine 16, countermeasures in the first three rows have been launched. The second spoiler 17 extends here by 60% of the total extension length of the spoiler.

A spoiler is extended by the use of an actuator. Preferably, each spoiler is provided with a separate actuator, even if it is possible to link two or more spoilers to each other by a mechanical linkage. The actuator may be a linear actuator, such as an electric motor driving a ball screw or a roller screw. The actuator is controlled by an electronic control unit (ECU), which receives an input signal indicating the number of launched countermeasures. The signal is used to determine the appropriate extension of the spoiler.

The input signal may either be a signal issued by the launch controller, or may be a measured signal. The measured signal may be a measured acoustic signal, which detects induced noise in the cavities. One or more detectors are mounted at the launch opening or at the bottom side of the cartridge and will detect either mechanical vibrations or acoustic sound vibrations. Such a signal may be advantageous since it allows an actual feedback of the induced noise signal, and is not dependent on the actual amount of launched countermeasures. The induced noise may depend on several conditions, such as flight speed, altitude, temperature, flight attitude, number of open cavities, etc. By using a feedback system based on a measured acoustic signal, the extension of the spoiler can be optimized at all times, which will reduce the air drag of the spoiler.

The spoiler may be either a solid spoiler, adapted to create a turbulent air flow over the openings of the cavities, or may be a diffusor spoiler, adapted to disturb the air flow such that no acoustic noise is induced. The spoiler may either extend outwards from an opening holding the spoiler, or may comprise one or more hinged flaps that are pivotally suspended at the front of the flap. The flap may be tilted outwards in dependency of the measured signal. The spoiler may be curved such that it corresponds to the curvature of the outer surface of the dispenser, depending on the size and shape of a launch opening. Normally, the outer surface of a dispenser for countermeasures is circular, which calls for a curved spoiler.

The invention is not to be regarded as being limited to the embodiments described above, a number of additional variants and modifications being possible within the scope of the subsequent patent claims. The cover may have different shapes and sizes and may be made from any suitable material.

REFERENCE SIGNS

1 Aircraft
2: Dispenser
3: Direction of launch
4: Trajectory
5: Countermeasure
6: Wing 7: Main body
8: Elongate body
10: Launch opening
11: First magazine
12: Cartridge
13: Cavity
14: Opening
15: First spoiler
16: Second magazine
17: Second spoiler

The invention claimed is:

1. A dispenser (2) for storing and launching a plurality of countermeasures (5), comprising an elongate body (8) provided with at least one launch opening (10) configured for storing the plurality of countermeasures (5) in cartridges (12), wherein:
the dispenser comprises a plurality of cartridges (12),
the dispenser is configured to be mounted on an aircraft (1) with the longitudinal direction of the elongate body (8) essentially coinciding with a direction of motion of the aircraft (1),
the dispenser (2) comprises a maneuverable spoiler (15, 17) located in front of the launch opening,
the spoiler (15, 17) is fully retracted before any of the plurality of countermeasures (5) have been launched,
the spoiler extends progressively outward in a predefined manner when each one of the plurality of countermeasures (5) has been launched from the plurality of cartridges (12),
the predefined manner in which the spoiler (15, 17) extends progressively outward is dependent upon a number of the launched countermeasures (5) having been launched, and
the extension of the spoiler is configured to create a turbulent air flow over the plurality of cartridges (12) when one or more of the plurality of countermeasures (5) has been launched.

2. The dispenser according to claim 1, wherein the spoiler (15, 17) is fully extended when all of the plurality of countermeasures have been launched.

3. The dispenser according to claim 2, wherein an actuator is configured to progressively extend the spoiler (15, 17) outwards in dependency of a measured signal.

4. The dispenser according to claim 3, wherein the measured signal is a measure of the number of launched countermeasures.

5. The dispenser according to claim 4, wherein the measured signal indicating the number of launched countermeasures is used as an input to a stored table, which determines the extension of the spoiler.

6. The dispenser according to claim 4, wherein the measured signal is a measure of an amount of acoustic noise induced in open cartridges (12) having had one of the plurality of countermeasures launched therefrom.

7. The dispenser according to claim 1, wherein the spoiler (15, 17) is a solid spoiler.

8. The dispenser according to claim 1, wherein the spoiler (15, 17) is a diffusor spoiler.

9. The dispenser according to claim 1, wherein the spoiler (15, 17) comprises a curvature that substantially follows a curvature of an outer surface of the dispenser (2).

10. The dispenser according to claim 1, wherein the dispenser comprises a plurality of launch openings (10), wherein each launch opening is provided with a maneuverable spoiler (15, 17).

11. A method for launching one or more of a plurality of countermeasures from a dispenser according to claim 1, wherein each of the plurality of countermeasures is arranged in a launch opening, the method comprising the steps of:
sending a launch signal to the countermeasure,
launching the countermeasure,
extending a spoiler in front of the launch opening in a predefined manner when at least one of the plurality of countermeasures has been launched.

12. The method according to claim 11, wherein the spoiler is fully extended when all of the plurality of countermeasures have been launched.

13. An aircraft comprising at least one dispenser according to claim 1.

14. A dispenser (2) for storing and launching a plurality of countermeasures (5), comprising an elongate body (8) provided with at least one launch opening (10) configured for storing the plurality of countermeasures (5) in cartridges (12), wherein:
the dispenser comprises a plurality of cartridges (12),
the dispenser is configured to be mounted on an aircraft (1) with the longitudinal direction of the elongate body (8) essentially coinciding with a direction of motion of the aircraft (1),
the dispenser (2) comprises a maneuverable spoiler (15, 17) located in front of the launch opening,
the spoiler (15, 17) is fully retracted before any of the plurality of countermeasures (5) have been launched,
the spoiler extends progressively outward in a predefined manner when each one of the plurality of countermeasures (5) has been launched from the plurality of cartridges (12),
the predefined manner in which the spoiler (15, 17) extends progressively outward is based upon a measured signal indicative of a number of the launched countermeasures (5) having been launched, and
the extension of the spoiler is configured to create a turbulent air flow over the plurality of cartridges (12) when one or more of the plurality of countermeasures (5) has been launched.

15. The dispenser according to claim 14, wherein the spoiler (15, 17) is fully extended when all of the plurality of countermeasures have been launched.

16. The dispenser according to claim 14, wherein an actuator is configured to progressively extend the spoiler (15, 17) outwards in dependency of the measured signal.

17. The dispenser according to claim 14, wherein the measured signal is a measure of an amount of acoustic noise induced in open cartridges (12) having had one of the plurality of countermeasures launched therefrom.

18. The dispenser according to claim 14, wherein the spoiler (15, 17) comprises a curvature that substantially follows a curvature of an outer surface of the dispenser (2).

19. The dispenser according to claim 14, wherein the dispenser comprises a plurality of launch openings (10), wherein each launch opening is provided with a maneuverable spoiler (15, 17).

20. An aircraft comprising at least one dispenser according to claim 14.

* * * * *